United States Patent
Heitjohann et al.

(10) Patent No.: US 12,036,914 B2
(45) Date of Patent: Jul. 16, 2024

(54) ADJUSTING UNIT FOR A LIGHT UNIT, AND HEADLAMP FOR A MOTOR VEHICLE

(71) Applicant: HELLA GmbH & Co. KGaA, Lippstadt (DE)

(72) Inventors: Peter Heitjohann, Rheda-Wiedenbrueck (DE); Martin Hunolt, Lippstadt (DE)

(73) Assignee: Hella GmbH & Co. KGAA, Lippstadt (DE)

( * ) Notice: Subject to any disclaimer, the term of this patent is extended or adjusted under 35 U.S.C. 154(b) by 0 days.

(21) Appl. No.: 18/143,375

(22) Filed: May 4, 2023

(65) Prior Publication Data
US 2023/0356647 A1    Nov. 9, 2023

(30) Foreign Application Priority Data
May 5, 2022  (DE) ..................... 10 2022 111 131.8

(51) Int. Cl.
*B60Q 1/068*   (2006.01)
*F16H 19/08*   (2006.01)

(52) U.S. Cl.
CPC ............ *B60Q 1/068* (2013.01); *F16H 19/08* (2013.01)

(58) Field of Classification Search
CPC ................................ B60Q 1/068; F16H 19/08
See application file for complete search history.

(56) References Cited

U.S. PATENT DOCUMENTS

| 10,434,927 | B2 | 10/2019 | Matejka et al. | |
| 2008/0130301 | A1* | 6/2008 | Kusagaya | B60Q 1/076 362/466 |
| 2011/0122642 | A1* | 5/2011 | Herbers | B60Q 1/0683 362/523 |
| 2019/0061602 | A1* | 2/2019 | Matejka | B60Q 1/072 |
| 2019/0176682 | A1* | 6/2019 | Seiger | B60Q 1/1423 |
| 2020/0010013 | A1* | 1/2020 | Herbers | B60Q 1/045 |
| 2020/0017020 | A1* | 1/2020 | Duerkopp | F21S 41/60 |
| 2023/0175661 | A1* | 6/2023 | Staffenberger | F21S 41/192 362/528 |

FOREIGN PATENT DOCUMENTS

| DE | 10045943 A1 | 3/2002 |
| DE | 10228947 A1 | 2/2004 |
| DE | 102013224334 A1 | 5/2015 |
| DE | 102018120836 A1 | 2/2019 |

* cited by examiner

*Primary Examiner* — Christopher E Dunay
(74) *Attorney, Agent, or Firm* — Muncy, Geissler, Olds & Lowe, P.C.

(57) ABSTRACT

An adjusting unit for adjusting the pose of a light unit of a headlamp, at least including two receiving units spaced a distance apart, each including an axially displaceable receiver for receiving the one light unit. Two shaft units are each operatively connected to a receiving unit in such a way that the receiver are axially displaceable with the aid of rotational movements of the shaft units. The shaft units each including at least two shaft bodies connected to each other in an articulated manner. A drive mechanism, which is operatively connected to the shaft units such that the shaft units are simultaneously rotatable with the aid of a rotational movement of the drive mechanism.

9 Claims, 4 Drawing Sheets

ADJUSTING UNIT FOR A LIGHT UNIT, AND HEADLAMP FOR A MOTOR VEHICLE

This nonprovisional application claims priority under 35 U.S.C. § 119(a) to German Patent Application No. 10 2022 111 131.8, which was filed in Germany on May 5, 2022, and which is herein incorporated by reference.

BACKGROUND OF THE INVENTION

Field of the Invention

The present invention relates to an adjusting unit for adjusting the pose of a light unit of a headlamp, as well as a headlamp fitted therewith for a motor vehicle.

Description of the Background Art

To generate a required light distribution, the light units of a motor vehicle headlamp must take on a setpoint pose, i.e., a setpoint position and orientation, within the headlamp housing. In particular, conventional headlamps include adjusting units for adjusting the pose of the light units, the adjusting units usually being able to be operated from outside the headlamp housing. This makes it possible to adjust the light units after the headlamp has been installed in the associated motor vehicle, in particular during a regular maintenance, to compensate for operation-induced deviations from the setpoint pose, for example due to component warping as a result of thermal and thermomechanical stresses on the headlamp in practical use.

With regard to the space requirements, adjusting units of this type compete with the various light units and other components accommodated within the headlamp housing, whose dimensions and arrangements are defined by technical as well as design requirements. It is therefore usually not possible to employ rigid shafts for transmitting torque from a central user interface to adjusting means on the individual light units.

For example, DE 102 28 947 A1, which is herein incorporated by reference, discloses a headlamp, which includes an adjusting unit for adjusting reflectors of light units, the adjusting unit including flexible shafts, with the aid of which mechanical connections may be established between a user interface and adjusting means on the individual reflectors for the purpose of transmitting torque. The flexible shafts may have greatly curved profiles, so that the limited space available between the light units may be optimally used.

Disadvantages of conventional adjusting units are the high manufacturing costs for the metallic flexible shafts and their connection to interface components, for example by injection molding.

SUMMARY OF THE INVENTION

It is therefore an object of the present invention to provide an alternative design of an adjusting unit for adjusting the pose of a light unit of a headlamp, as well as a motor vehicle headlamp fitted therewith, the adjusting unit principally having a high degree of configurability with respect to its space requirements within the headlamp housing and being able to be more easily and cost-effectively manufactured compared to the concept known from the prior art having metallic flexible shafts.

According to an example, the adjuster can comprise two receiving units, spaced a distance apart, each including an axially displaceable receiver for receiving the one light unit, two shaft units, which are each operatively connected to a receiving unit in such a way that the receiver are axially displaceable with the aid of rotational movements of the shaft units, the shaft units each including at least two shaft bodies connected to each other in an articulated manner; and a drive mechanism, which is operatively connected to the shaft units in such a way that the shaft units are simultaneously rotatable with the aid of a rotational movement of the drive mechanism.

The invention is based on the idea of equipping the adjuster with shaft units constructed from shaft bodies, which are rigid in sections, and torque-transmitting joints arranged therebetween, in such a way that the shaft bodies may assume positions at an angle with respect to each other, and the profile of the shaft units is this adaptable to the installation space present in the headlamp. The shaft bodies are connected to each other by the joints so that the number of necessary support structures for receiving the shaft units in the headlamp is small. The shaft units according to the invention and/or the drive mechanism may be designed, in particular, as cost-effective plastic components manufactured by injection molding.

The actuation of the drive mechanism may take place from an interface on the housing of the headlamp, in particular, with the aid of a mechanical adjusting member. Alternatively, the drive mechanism may comprise an electric motor. The operative connections between the receiving units, the shaft units, and the drive mechanism are formed, for example, with the aid of suitable toothings.

Each shaft unit preferably comprises at least one ball joint for the articulated connection between two shaft bodies, and/or the ball joint being designed to transmit torque, in particular in that the joint balls include protruding driving pins, and the joint socket having corresponding driving pin slots for receiving the driving pins. The driving pins adjoin the edges of the driving pin slots, by means of which form-fitting connections for transmitting torque are formed. The driving pins are displaceable along the driving pin slots, so that a three-axis rotatability of the ball joint is given.

In particular, the joint ball of the ball joint can be received in the joint socket with the aid of a snap-on connection, and/or the joint socket having a hollow cylindrical tolerance compensation section. To establish the snap-on connection, the joint ball and the joint socket are assembled by means of resilient spreading, i.e., the joint socket is first elastically deformed during the insertion of the joint ball, and an elastic rebound then takes place. The inner contour of the joint socket essentially corresponds to a section of a ball surface having an inserted hollow cylindrical section. The axis of this tolerance compensation section is suitably oriented along the mounting direction of the joint ball.

A displacement of the receiver in opposite directions may be generated with the aid of the simultaneous rotational movements of the shaft units in such a way that a light unit received on the receiver is rotatable around a rotation axis running between the receiver. The displacement directions of the two receiver are oriented essentially in parallel to each other, and the one receiver is displaced forward and the other one backward during the displacement in opposite directions. A corresponding rotation of the light unit is generated thereby. For example, the rotation axis in the provided installation pose of the associated headlamp is oriented vertically on the motor vehicle, so that the pose of the light unit, and thus the emitted light distribution, is adjustable in the horizontal plane with the aid of the adjusting unit. In contrast thereto, in one specific embodiment of the adjusting unit including two receiver running in the same direction, a translational displacement of the light unit received thereon may be generated.

The operative connections may each be further advantageously formed between the receiving units and the shaft units with the aid of a bevel gear unit, the shaft bodies, in particular, including an end-side bevel gear pinion, and the receiving units including a crown wheel. In a specific embodiment of this type, a displacement of the receiver in opposite directions may be generated with the aid of rotational movements of the crown wheels in opposite directions.

The invention further relates to a headlamp for a motor vehicle, at least comprising an adjusting unit according to one of the aforementioned specific embodiments, a light unit received thereon, and a housing, the receiving units and the drive mechanism being received at least indirectly on the housing, so that the adjusting unit is held in the housing at at least three points. For example, the adjusting unit may be received on a supporting frame connected to the housing at the three points mentioned.

The headlamp according to the invention preferably includes an adjusting member accessible from outside the housing, which is operatively connected to the drive mechanism in such a way that the drive mechanism is rotatable by means of a rotational movement of the adjusting member. For example, the adjusting member is designed as a rigid shaft, which interacts with the drive mechanism via a suitable toothing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
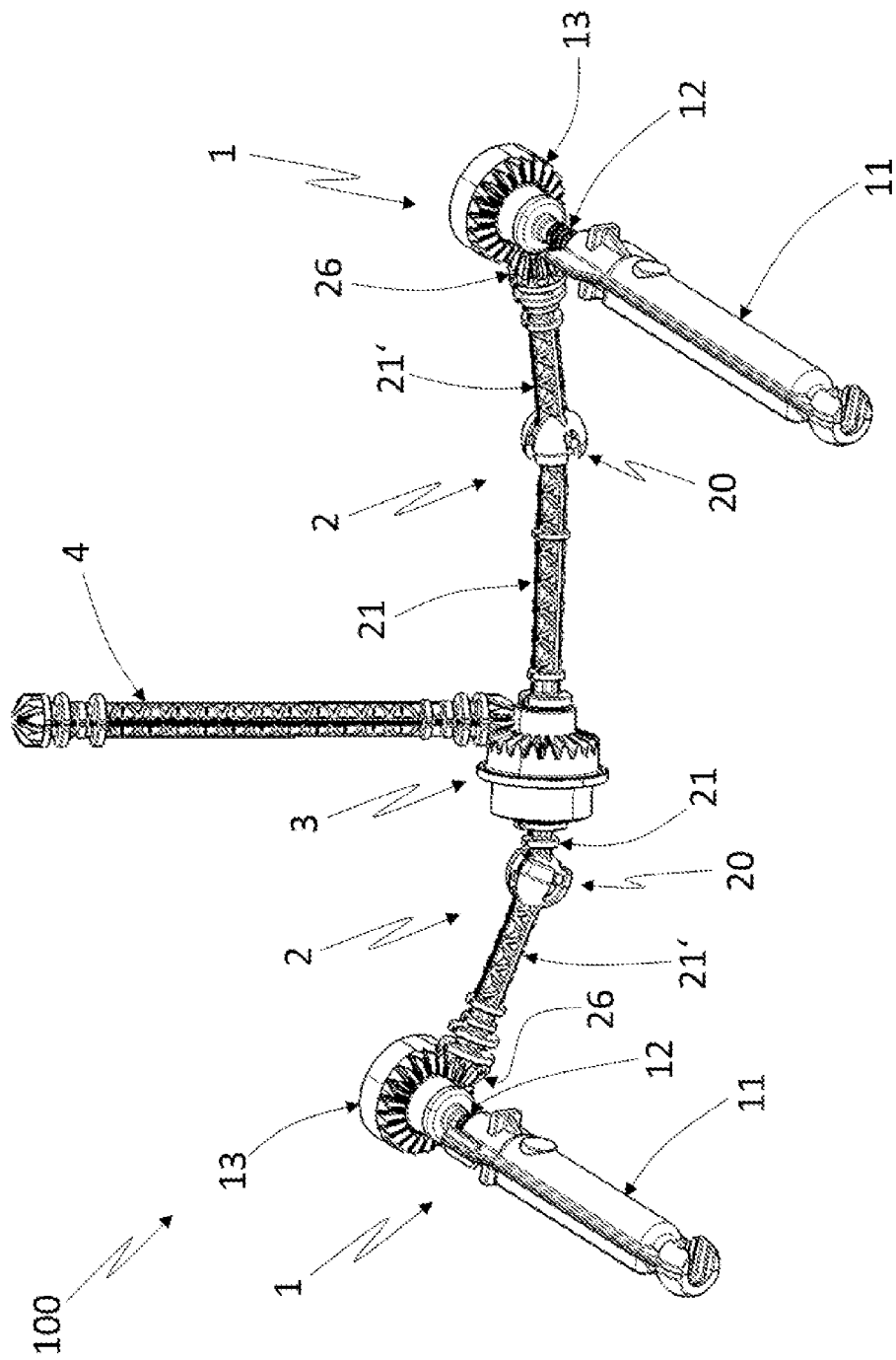
FIG. 1 shows a perspective view of an adjusting unit according to the invention.

FIG. 1 shows a perspective view of an adjusting unit 100 according to the invention, which comprises the two receiving units 1, spaced a distance apart, including axially displaceable receiver 11 for a light unit, the two shaft units 2, which are each operatively connected to a receiving unit 1, in such a way that receiver 11 are axially displaceable with the aid of rotational movements of shaft units 2, shaft units 2 each having shaft bodies 21, 21', which are connected to each other in an articulated manner, as well as drive mechanism 3, which is operatively connected to shaft units 2 in such a way that shaft units 2 may rotate simultaneously with the aid of a rotational movement of drive mechanism 3. The majority of the components of adjusting unit 100 are made up, for example, of injection-molded parts which are cost-effective to manufacture.

Receiving units 1 comprise screw shafts 12, which support receiver 11. Receiver 11 have female threads, which are in engagement with the threads of screw shafts 12, so that an axial displacement of receiver 11 takes place during a rotational movement of screw shafts 12. A rotational movement may be introduced into screw shafts 12 via crown wheels 13, crown wheels 13 meshing with bevel gear pinions 26 of shaft units 2, forming bevel gear units.

Rigid shaft bodies 21, 21' of shaft units 2 are connected to each other in an articulated manner with the aid of torque-transmitting ball joints 20. This configuration permits a position of shaft bodies 21, 21' at an angle to each other, by means of which, according to the invention, the advantage of an adaptability of shaft units 2 to the installation space specifically available in a headlamp arises.

Drive mechanism 3 is in engagement with adjusting member 4, provided as the user interface, via a bevel gear unit and is rotatably fixedly connected to internal shaft bodies 21. Drive mechanism 3 is rotatably supported in the associated headlamp and may include, for example, a safety snap-on coupling. During a rotational movement of drive mechanism 3, simultaneous rotational movements of crown wheels 13 running in opposite directions are generated via shaft units 2, and thus displacements of receiver 11 in opposite directions. The threads of screw shafts 12 of both receiving units 1 are designed to run in the same direction for this purpose.

Figure 2A:
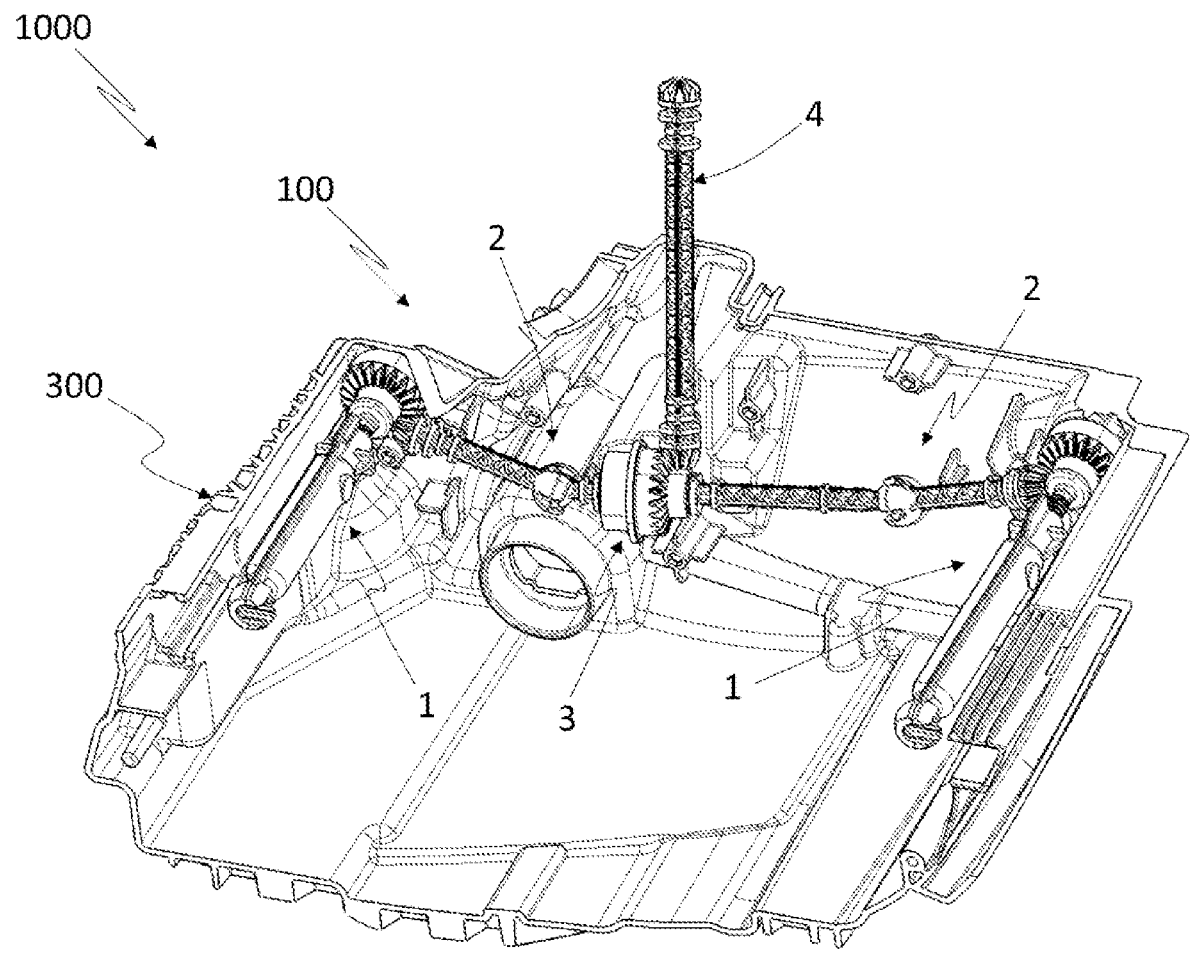
FIGS. 2a and 2b show perspective views of a part of a headlamp according to the invention, without or with a light unit.
Figure 2B:
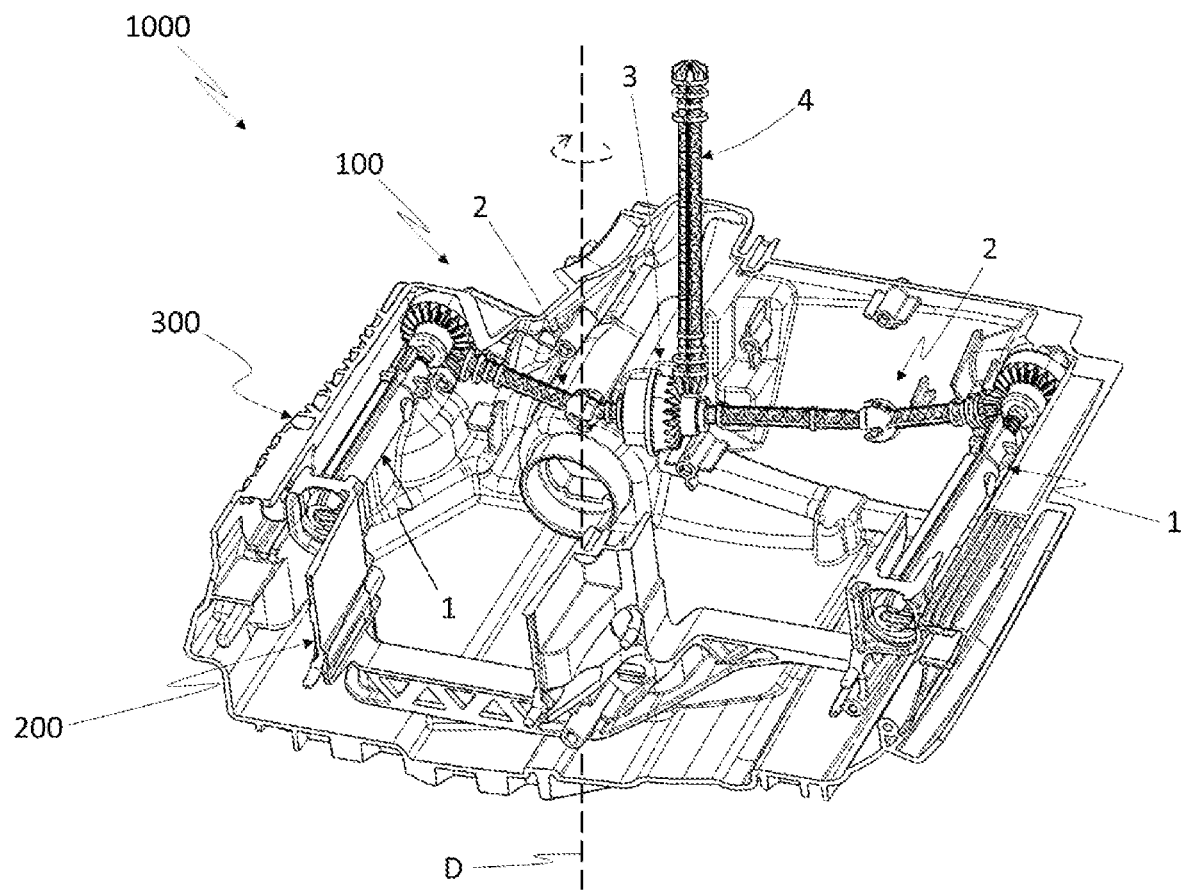

FIG. 2a and FIG. 2b show perspective views of a part of a headlamp 1000 according to the invention without and with a light unit 200 received on receiving units 1 of adjusting unit 100, for example, a daytime running light unit. For the purpose of clarity of representation, only one half of a support frame received on receiving units 1 is illustrated in FIG. 2b as a component of light unit 200. Adjusting unit 100 is received at three points on housing 300 of headlamp 1000, namely on the two receiving units 1 and drive mechanism 3, the receptacles providing bearings of this type so that screw shafts 12 and crown wheels 13 (cf. FIG. 1) of receiving units 1 as well as drive mechanism 3 are rotatable.

Introducing a rotational movement into adjusting member 4 makes it possible to generate a displacement in opposite directions of the sections of light unit 200 received on receiving units 1, so that light unit 200 may be placed into a rotation around rotation axis D for the purpose of adjusting its pose. To avoid jamming, the connection of light unit 200 to receiving units 1 must have a suitable resiliency. In the provided installation pose of headlamp 1000 on a motor vehicle, rotation axis D is oriented vertically, so that an adjustment of light unit 200 in the horizontal plane may be carried out with the aid of adjusting unit 100.

Figure 3A:
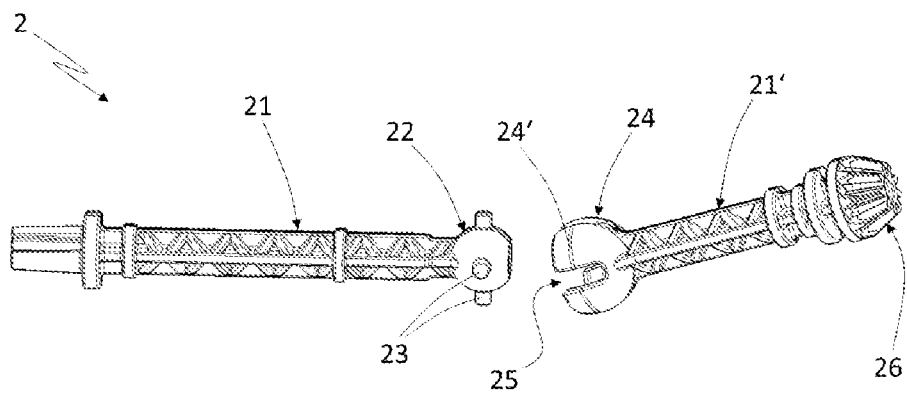
FIGS. 3a to 3c show perspective views of a shaft unit of an adjusting unit according to the invention.
Figure 3B:
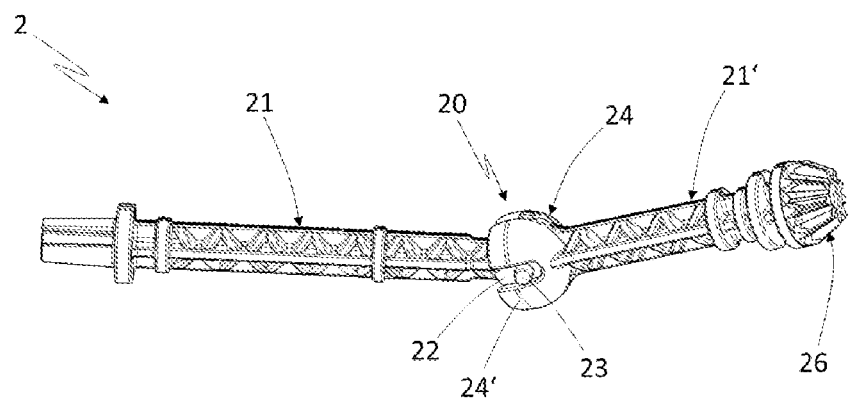
Figure 3C:
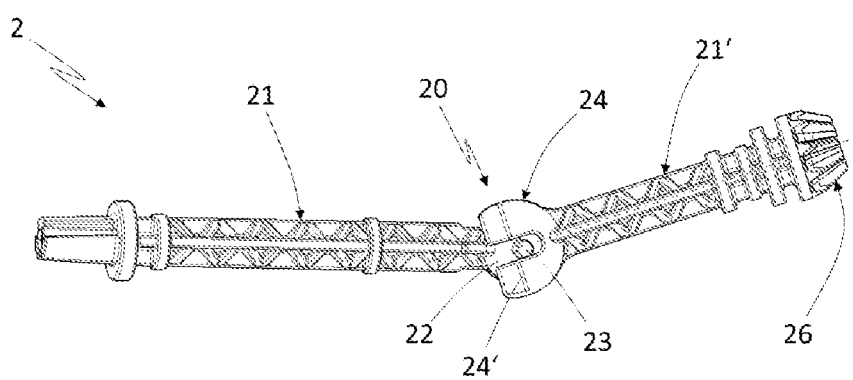

FIG. 3a through FIG. 3c show perspective views of a shaft unit 2 as a component of an adjusting unit according to the invention. FIG. 3a shows the two shaft bodies 21, 21' in the separated state. During the course of mounting, shaft bodies 21, 21' are assembled in such a way that a snap-on connection between ball head 22 on shaft body 21 and joint socket 24 on shaft body 21' is formed by means of resilient spreading. Ball joint 20 is formed thereby, which is formed with the aid of driving pins 23 engaging with driving pin slots 25 for transmitting torques between shaft bodies 21, 21'. Driving pins 23 adjoin the edges of driving pin slots 25 in a form-fitting manner and are displaceable along driving pin slots 25.

Hollow cylindrical tolerance compensation section 24' forms an extension of joint socket 24 in the mounting direction of ball head 22 and thus permits a low-friction rotatability of ball head 22 in joint socket 24 even in the presence of dimensional warping of the individual components of shaft unit 2.

End-side bevel gear pinions 26 are used to engage with the crown wheels of the receiving units, forming bevel gear units.

Shaft bodies 21, 21', together with their functional end sections, i.e., ball head 22 or joint socket 24 and bevel gear pinion 26, are each advantageously provided with a one-piece design and formed from the same material by injection molding.

The design of the invention is not limited to the preferred exemplary embodiments specified above. Instead, a number of variants are conceivable, which make use of the illustrated approach, even in fundamentally different designs. All features and/or advantages arising from the claims, the description and/or the drawings, including structural details and spatial arrangements, may be essential to the invention individually as well as in the a wide range of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjuster to adjust a pose of a light unit of a headlamp, the adjuster comprising:
    two receiving units spaced a distance apart, each of the two receiving units comprising an axially displaceable receiver to receive the light unit;
    two shaft units, which are each operatively connected to one of the receiving units such that the receiver is axially displaceable with the aid of rotational movements of the respective shaft unit connected thereto, and the shaft units each including at least two shaft bodies connected to each other in an articulated manner; and
    a drive mechanism operatively connected to the shaft units such that the shaft units are simultaneously rotatable with the aid of a rotational movement of the drive mechanism.

2. The adjuster according to claim 1, wherein each shaft unit comprises at least one ball joint for the articulated connection of the at least two shaft bodies, the at least one ball joint being designed to transmit torque, wherein the at least one ball joint includes a ball head having protruding driving pins and a joint socket that has corresponding driving pin slots for receiving the driving pins.

3. The adjuster according to claim 2, wherein the ball head is received in the joint socket with the aid of a snap-on connection, and/or the joint socket has a hollow cylindrical tolerance compensation section.

4. The adjuster according to claim 1, wherein a displacement of the receiver of each of the two receiving units in opposite directions is generated with the aid of the simultaneous rotational movements of the shaft units, such that the light unit that is received on the receivers is rotatable around a rotation axis running between the receivers.

5. The adjuster according to claim 4, wherein the receiving units are operatively connected to the shaft units with a bevel gear unit, wherein each bevel gear unit includes a bevel gear pinion provided on an end of each of the shaft bodies of the shaft units and a crown wheel that meshes with the bevel gear pinion, and wherein rotation of the crown wheel causes axial displacement of the receiver.

6. The adjuster according to claim 5, wherein a displacement of the receiver of each of the two receiving units in opposite directions is generated with the aid of rotational movements of the crown wheels in opposite directions.

7. The adjuster according to claim 1, wherein the shaft units and/or the drive mechanism are plastic components manufactured by injection molding.

8. A headlamp for a motor vehicle, the headlamp comprising:
    the adjuster according to claim 1;
    the light unit received thereon; and
    a housing,
    wherein the receiving units and the drive mechanism are received at least indirectly on the housing so that the adjuster is held in the housing at at least three points.

9. The headlamp according to claim 8, wherein the headlamp includes an adjusting member accessible from outside the housing, which is operatively connected to the drive mechanism such that the drive mechanism is rotatable by a rotational movement of the adjusting member.

* * * * *